United States Patent
Nakata et al.

(10) Patent No.: US 9,789,818 B2
(45) Date of Patent: Oct. 17, 2017

(54) IMAGE PROCESSING APPARATUS, IMAGING APPARATUS AND DRIVE ASSISTING METHOD

(71) Applicant: KYOCERA CORPORATION, Kyoto (JP)

(72) Inventors: Takatoshi Nakata, Yokohama (JP); Takahiro Okada, Okazaki (JP)

(73) Assignee: KYOCERA Corporation, Kyoto (JP)

( * ) Notice: Subject to any disclaimer, the term of this patent is extended or adjusted under 35 U.S.C. 154(b) by 165 days.

(21) Appl. No.: 14/395,601

(22) PCT Filed: Apr. 16, 2013

(86) PCT No.: PCT/JP2013/002563
§ 371 (c)(1),
(2) Date: Oct. 20, 2014

(87) PCT Pub. No.: WO2013/157250
PCT Pub. Date: Oct. 24, 2013

(65) Prior Publication Data
US 2015/0070486 A1    Mar. 12, 2015

(30) Foreign Application Priority Data
Apr. 20, 2012 (JP) .................. 2012-097067

(51) Int. Cl.
*H04N 7/18* (2006.01)
*B60T 7/12* (2006.01)
(Continued)

(52) U.S. Cl.
CPC .............. *B60R 1/00* (2013.01); *G08G 1/0962* (2013.01); *G08G 1/16* (2013.01); *G08G 1/168* (2013.01);
(Continued)

(58) Field of Classification Search
CPC .................. B60R 1/00; G09G 2340/12; G09G 2320/0666
See application file for complete search history.

(56) References Cited

U.S. PATENT DOCUMENTS

| | | | |
|---|---|---|---|
| 7,366,595 B1 * | 4/2008 | Shimizu ................. | B60K 35/00 340/937 |
| 8,134,594 B2 * | 3/2012 | Nagamine ............. | B60W 40/02 348/148 |

(Continued)

FOREIGN PATENT DOCUMENTS

| | | |
|---|---|---|
| EP | 1 065 642 A2 | 1/2001 |
| JP | 2000-280822 A | 10/2000 |

(Continued)

OTHER PUBLICATIONS

International Search Report; PCT/JP2013/002563; Jul. 16, 2013.
(Continued)

*Primary Examiner* — Tison B Owens
(74) *Attorney, Agent, or Firm* — Studebaker & Brackett PC (57) ABSTRACT

An image processing apparatus includes an I/F, a synthesizer, and a color determinator. The I/F obtains a captured image, which is generated by imaging a subject in the vicinity of a vehicle. The synthesizer superimposes an indicator on the captured image. The color determinator, when color of the captured image is similar to a first color, changes color of the indicator from the first color.

8 Claims, 5 Drawing Sheets

(51) Int. Cl.
*B60R 1/00* (2006.01)
*G08G 1/16* (2006.01)
*G08G 1/0962* (2006.01)
*G09G 5/02* (2006.01)

(52) U.S. Cl.
CPC .......... *G09G 5/02* (2013.01); *B60R 2300/307* (2013.01); *B60R 2300/802* (2013.01); *G08G 1/165* (2013.01); *G09G 2320/0613* (2013.01); *G09G 2320/0666* (2013.01); *G09G 2340/12* (2013.01); *G09G 2380/10* (2013.01)

(56) References Cited

U.S. PATENT DOCUMENTS

| | | | |
|---|---|---|---|
| 9,357,180 B2* | 5/2016 | Numata | B60R 1/00 |
| 9,363,485 B2* | 6/2016 | Numata | B60R 1/00 |
| 2006/0287826 A1* | 12/2006 | Shimizu | B60K 35/00 |
| | | | 701/431 |
| 2007/0013495 A1 | 1/2007 | Suzuki et al. | |
| 2011/0069169 A1* | 3/2011 | Kadowaki | B60R 1/00 |
| | | | 348/148 |
| 2013/0162829 A1* | 6/2013 | Kadowaki | B62D 15/028 |
| | | | 348/148 |
| 2013/0169797 A1* | 7/2013 | Min | G06K 9/00805 |
| | | | 348/135 |
| 2013/0307985 A1* | 11/2013 | Numata | B60R 1/00 |
| | | | 348/148 |
| 2015/0062341 A1* | 3/2015 | Nakata | G09G 5/00 |
| | | | 348/148 |

FOREIGN PATENT DOCUMENTS

| | | |
|---|---|---|
| JP | 2002-362270 A | 12/2002 |
| JP | 2008-137425 A | 6/2008 |
| JP | 2010-001020 A | 1/2010 |
| JP | 2010-018102 A | 1/2010 |
| WO | 2011/013813 A1 | 2/2011 |

OTHER PUBLICATIONS

Written Opinion of the International Searching Authority; PCT/JP2013/002563; Jul. 16, 2013; with concise explanation.

The extended European search report issued by the European Patent Office on Mar. 3, 2016, which corresponds to European Patent Application No. 13777578.9-1803 and is related to U.S. Appl. No. 14/395,601.

The Communication pursuant to Article 94(3) EPC issued by the European Patent Office on May 26, 2017, which corresponds to European Patent Application No. 13777578.9-1803 and is related to U.S. Appl. No. 14/395,601.

* cited by examiner

IMAGE PROCESSING APPARATUS, IMAGING APPARATUS AND DRIVE ASSISTING METHOD

CROSS REFERENCE TO RELATED APPLICATION

This application claims priority to and the benefit of Japanese Patent Application No. 2012-097067 filed on Apr. 20, 2012, the entire contents of which are incorporated herein by reference.

TECHNICAL FIELD

The present invention relates to an image processing apparatus for superimposing an indicator on a captured image generated by imaging the vicinity of a vehicle, and also to an imaging apparatus and a drive assisting method.

BACKGROUND ART

There is known a vehicle drive assisting apparatus that, during running of a vehicle, displays a captured image of the vicinity of the vehicle imaged by an imaging apparatus mounted on the vehicle on a display apparatus installed in the vehicle. A driver, by checking the captured image displayed on the display apparatus, may recognize obstacles in the vicinity of the vehicle while driving the vehicle and also, in parking, park the vehicle accurately and easily in a parking space.

Further, in one example the drive assisting apparatus displays, in addition to the captured image of the vicinity of the vehicle, an indicator for assisting driving superimposed on the captured image (for example, Patent Document 1). The indicator superimposed on the captured image is, for example, a predicted path guide line of the vehicle. The captured image having the indicator superimposed thereon allows the driver to more accurately and easily recognize a distance between the vehicle and an object as well as a width of the vehicle.

RELATED ART DOCUMENT

Patent Document

Patent Document 1: Japanese Patent Application Laid-Open Publication No. 2010-001020

SUMMARY OF INVENTION

Technical Problem

The indicator being displayed, for its purpose, preferably stands out as much as possible against the captured image displayed as a background. As such, the indicator is generally colored yellow or red, for example, for easy recognition to the driver.

However, color of the captured image overall is sometimes similar to the color of the indicator. For example, at nighttime or indoors, when the vicinity of the vehicle is illuminated by light sources such as head lamps, tail lights, or brake lights, the captured image is entirely stained color of the light from the light sources and the color of the captured image may become similar to the color of the indicator. In such a case, the driver may have difficulty in viewing the indicator.

Accordingly, an object of the present invention in view of the above problem is to provide an image processing apparatus, an imaging apparatus and a drive assisting method for maintaining a visibility of the indicator when the color of the captured image is similar to the color of the indicator.

Solution to Problem

In order to solve the above problem, an image processing apparatus according to a first aspect of the present invention includes:

a receiver for receiving a captured image generated by imaging a subject in the vicinity of a vehicle;

a synthesizer for superimposing an indicator on the captured image; and a color determinator for changing color of the indicator from a first color when color of the captured image is similar to the first color.

Preferably, a second aspect of the present invention is the image processing apparatus, wherein the receiver is capable of receiving a lighting signal for lighting up a light source of the vehicle that emits illumination light in the first color to the vicinity of the vehicle, and the color determinator, when receiving the lighting signal, changes the color of the indicator to a second color.

Preferably, a third aspect of the present invention is the image processing apparatus, including a detector for detecting color of the subject based on the captured image generated while the light source is lit up, wherein the color determinator, when the color of the subject that is detected is similar to the second color, changes the color of the indicator to a third color.

Preferably, a fourth aspect of the present invention is the image processing apparatus, wherein the color determinator, at least one of when the superimposition of the indicator is carried out at nighttime and when the vehicle is located indoors, changes the color of the indicator from the first color.

Preferably, a fifth aspect of the present invention is the image processing apparatus, including a detector for detecting the color of the subject based on the captured image.

Preferably, a sixth aspect of the present invention is the image processing apparatus, wherein the color determinator changes the color of the indicator such that at least one of hue, brightness, and intensity of the color of the indicator differs from those of the color of the captured image.

Preferably, a seventh aspect of the present invention is the image processing apparatus, wherein the color determinator changes the color of the indicator to complementary color of the color of the subject.

In order to solve the above problem, an imaging apparatus according to an eighth aspect of the present invention includes:

an imager for generating a captured image by imaging a subject in the vicinity of a vehicle;

a synthesizer for superimposing an indicator on the captured image; and a color determinator, when color of the captured image is similar to a first color, for changing color of the indicator from the first color.

Although the apparatus has been described above as the solution according to the present invention, a method, a program, and a storage medium storing the program that are substantially corresponding to the apparatus may also implement the present invention and thus are included in the scope of the present invention.

For example, a drive assisting method according to a ninth aspect of the present invention for implementing the present invention as a method includes:

an imaging step of generating a captured image by imaging a subject in the vicinity of a vehicle;

a comparison step of comparing color of the subject to a first color;

a changing step of changing color of an indicator from the first color when the color of the subject is similar to the first color; and a superimposing step of superimposing, on the captured image, the indicator in the first color or in color after the change at the changing step.

Effect of the Invention

According to the image processing apparatus, the imaging apparatus and the drive assisting method of the present invention that are configured as described above, when the color of the captured image is similar to the color of the indicator, a visibility of the indicator may be maintained.

DESCRIPTION OF EMBODIMENTS

Hereinafter, embodiments of the present invention will be described with reference to the accompanying drawings.

Figure 1:
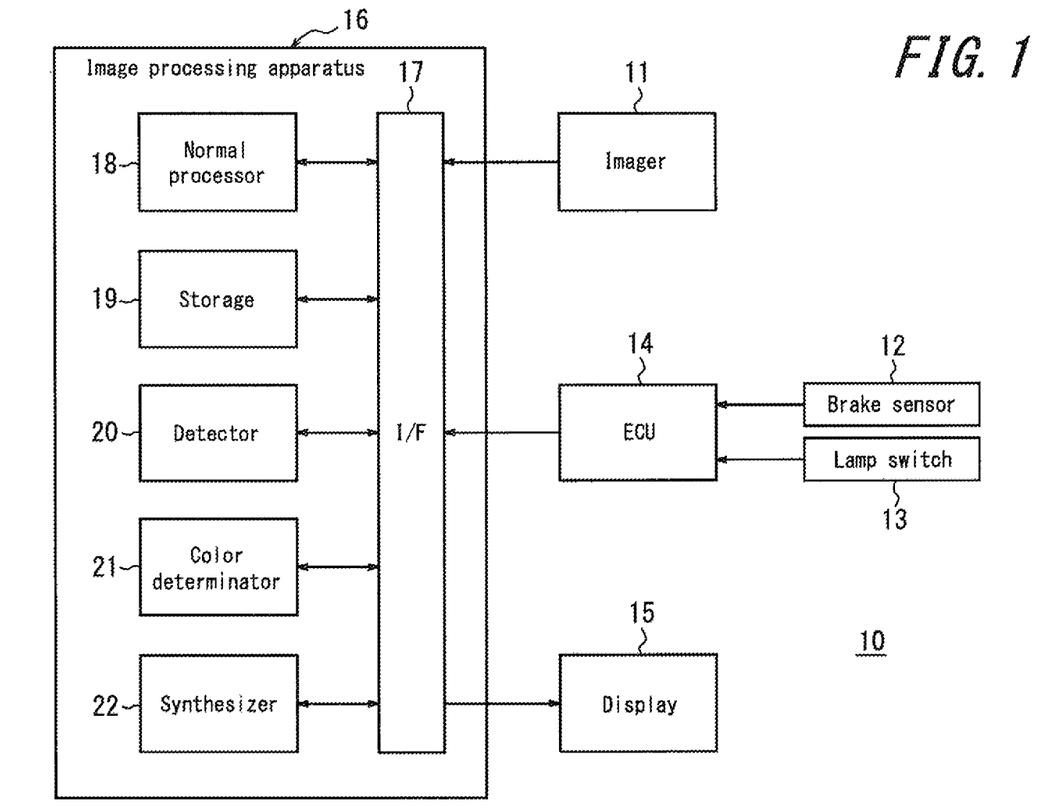
FIG. 1 is a block diagram illustrating a schematic configuration of a drive assisting apparatus including an image processing apparatus according to a first embodiment of the present invention.

First, a drive assisting apparatus including an image processing apparatus according to a first embodiment will be described. As illustrated in FIG. 1, a drive assisting apparatus 10 according to the present embodiment includes an imager 11, a brake sensor 12, a lamp switch 13, an ECU (Engine Control Unit) 14, a display 15, and an image processing apparatus 16.

The imager 11 is installed so as to be able to image behind a vehicle. For example, the imager 11 is fixed to an upper rear portion of the vehicle at a depression angle of about 30° so as to capture a subject in an area of approximately 8 meters behind the vehicle. The imager 11 includes an optical system and an image sensor and captures a subject image formed on the image sensor by the optical system. The image sensor includes a color filter array and is capable of capturing a color image. The imager 11, in order to display a video in real time, captures one frame of the subject image, for example, every 1/30 second. The imager 11 generates an image signal of the captured image thus captured and transmits the image signal to the image processing apparatus 16.

The brake sensor 12 detects a depression amount of a brake pedal. The brake sensor 12 transmits the depression amount thus detected to the ECU 14.

The lamp switch 13 detects a lighting-up input and a lighting-out input to head lamps of the vehicle. The lamp switch 13 transmits the input thus detected to the ECU 14.

The ECU 14 obtains information and inputs detected by various sensors and switches provided to the vehicle and controls operations of the vehicle in a variety of manners. For example, based on an accelerator position detected by an accelerator sensor and temperature detected by temperature sensors provided at various portions of an engine, the ECU 14 adjusts a fuel feeding amount to the engine. Further, the ECU 14 adjusts a braking force based on a depression amount detected by the brake sensor 12 and also lights up brake lamps for emitting a first color light, e.g., red light. Further, based on the lighting-up input or the lighting-out input detected by the lamp switch 13, the ECU 14 light up or light out the head lamps.

Further, the ECU 14 notifies the image processing apparatus 16 of braking information indicating a braking state based on the depression amount detected by the brake sensor 12 and lighting information indicating that the head lamps are lit up based on the lighting-up input detected by the lamp switch 13.

The display 15 is, for example, an LCD and disposed in the vicinity of a driver's seat. The display 15 may display the video in real time. The display 15, in order to display the video in real time, obtains an image signal of one frame, for example, every 1/30 second from the image processing apparatus 16 and, by changing the image being displayed every 1/30 second, displays the video.

The image processing apparatus 16 carries out predetermined image processing on the image signal generated by the imager 11 and transmits thus processed image signal to the display 15. As described above, the imager 11 generates the image signal of one frame every 1/30 second, and the image processing apparatus 16 obtains the image signal of one frame every 1/30 second. The image processing apparatus 16 processes the obtained image signal and transmits thus processed image signal to the display 15 every 1/30 second.

The image processing apparatus 16 includes a drive assisting function for reverse travel, and may carry out image processing to display a drive assisting indicator on the video displayed in real time, so as to assist the reverse travel. Now, the display of the drive assisting indicator will be described together with a configuration of the image processing apparatus 16. The image processing apparatus 16 includes an I/F 17, a normal processor 18, a storage 19, a detector 20, a color determining unit 21, and a synthesizer 22.

The I/F 17 is connected to the imager 11, the ECU 14, and the display 15 and thus capable of exchanging the information and the signal therewith. For example, the I/F 17 receives the image signal from the imager 11, and also receives the braking information and the lighting information from the ECU 14. Also, the I/F 17 transmits the image signal having been subjected to the image processing in the image processing apparatus 16 to the display 15. Further, the I/F 17 is connected to the normal processor 18, the storage 19, the detector 20, the color determinator 21, and the synthesizer 22 and exchanges the information and the signal therewith.

The normal processor 18 carries out, to the captured image obtained from the imager 11, normal image processing such as AGC, white balance, color interpolation, and gamma correction.

The storage 19 stores data necessary for various control executed by the image processing apparatus 16. The storage 19 stores, for example, an outline and a position of the drive assisting indicator.

The detector 20, based on the image signal obtained from the imager 11, detects color in the vicinity of a position where the drive assisting indicator is to be superimposed in the captured image. The detector 20, when obtaining the lighting information, i.e., when the head lamps are lit up, detects the color of the captured image.

The color determinator 21, based on the lighting information, the braking information, and the color of the subject in the vicinity of the position where the drive assisting indicator is to be superimposed in the captured image, determines color of the drive assisting indicator. The color determinator 21, in order to determine the color of the drive assisting indicator, determines whether the head lamps are lit up based on the lighting information.

When the head lamps are off, the color determinator 21 determines a first color, e.g., red as the color of the drive assisting indicator. When the head lamps are on, the color determinator 21 further determines whether the color in the vicinity of the position where the drive assisting indicator is to be superimposed in the captured image is similar to blue green.

According to the present embodiment, colors within a range of an angle of a° from blue green on both sides thereof in a color wheel are determined as colors similar to blue green. When the color in the vicinity of the position where the drive assisting indicator is to be superimposed in the captured image is not similar to blue green, the color determinator 21 determines a second color, e.g., blue green as the color of the drive assisting indicator. When the color in the vicinity of the position is similar to blue green, the color determinator 21 determines a third color, e.g., yellow as the color of the drive assisting indicator.

The synthesizer 22 superimposes the drive assisting indicator on the captured image having been subjected to the normal image processing. The synthesizer 22, in order to superimpose the drive assisting indicator, retrieves the position and the outline thereof from the storage 19 and obtains the determined color from the color determinator 21. The synthesizer 22 colors the inside of the outline of the drive assisting indicator the color determined by the color determinator 21 and superimposes the drive assisting indicator thus colored at the position in the captured image retrieved from the storage 19.

Figure 2:
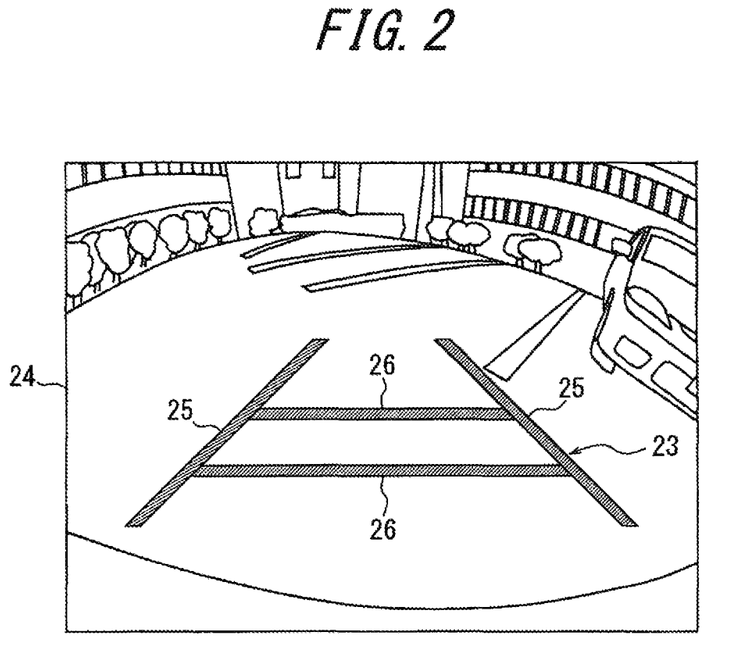
FIG. 2 is a captured image including a drive assisting indicator superimposed thereon displayed in a display.

When the drive assisting function is executed, the captured image 24 as illustrated in FIG. 2 including the drive assisting indicator 23 superimposed thereon is synthesized and displayed in the display 15. The drive assisting indicator 23 is made up of vehicle width extension lines 25 and reference distance lines 26. The vehicle extension lines 25 are trajectories on which either side of the vehicle passes during the reverse travel. The reference distance lines 26 indicate predetermined distances from the vehicle such as, for example, 1 meter and 3 meters. A driver, by referring to the drive assisting indicator 23, may recognize a traveling direction during the reverse drive of the vehicle.

Figure 3:
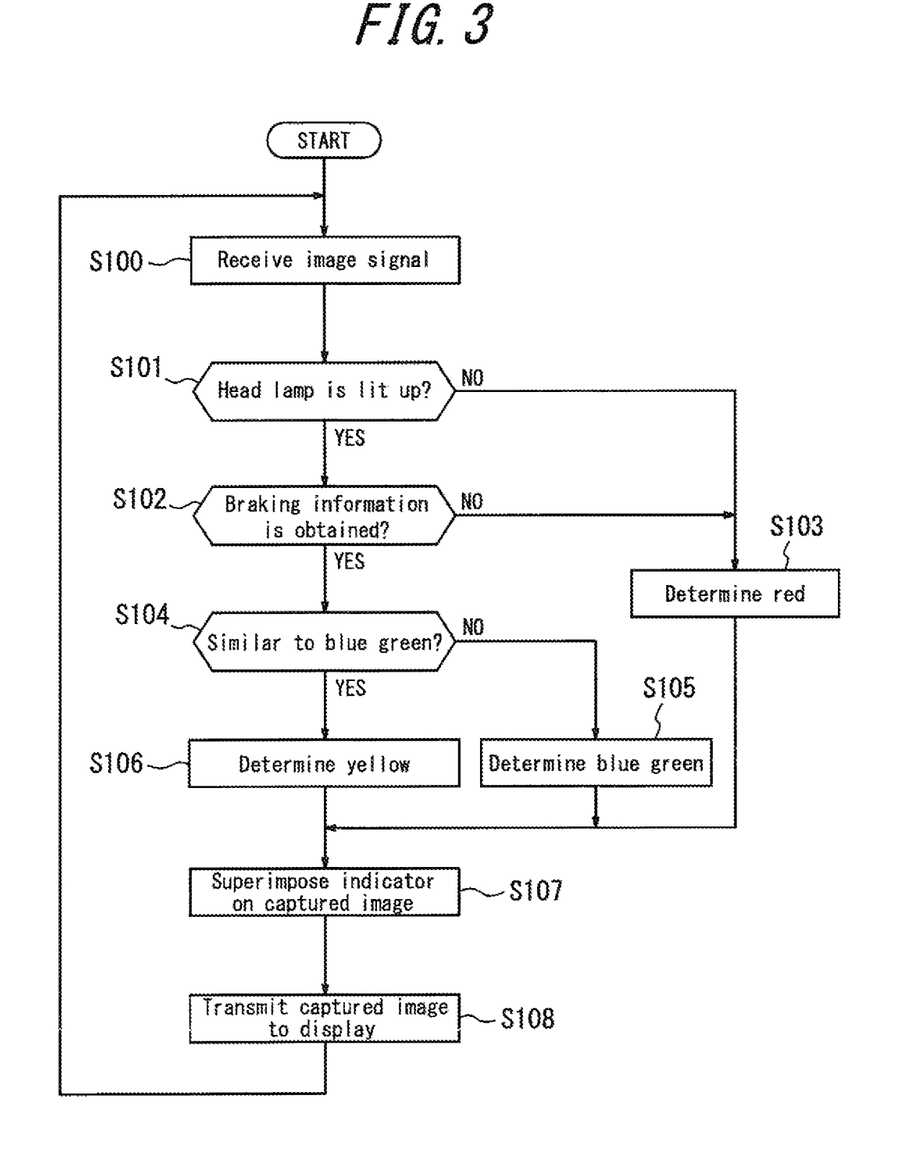
FIG. 3 is a flowchart of a drive assisting processing executed by the image processing apparatus according to the first embodiment.

Next, the drive assisting processing executed by the image processing apparatus 16 will be described with reference to a flowchart in FIG. 3. The drive assisting processing starts when an input unit of the image processing apparatus 16 detects an input to start execution of the drive assisting function. Also, the drive assisting processing ends upon detection of an input to end the execution of the drive assisting function.

At step S100, the image processing apparatus 16 receives the image signal from the imager 11. After the reception of the image signal, the process proceeds to step S101.

At step S101, the image processing apparatus 16 determines whether the lighting information has been obtained. When the lighting information has been obtained, the image processing apparatus 16 determines that the head lamps are on, and the process proceeds to step S102. When the lighting information has not been obtained, the image processing apparatus 16 determines that the head lamps are off, and the process proceeds to step S103.

At step S102, the image processing apparatus 16 determines whether the braking information has been obtained. When the braking information has not been obtained, the image processing apparatus 16 determines that the brake lamps are off, and the process proceeds to step S103.

At step S103, the image processing apparatus 16 determines red as the color of the drive assisting indicator 23. After the determination of the color, the process proceeds to step S107.

At step S104, the image processing apparatus 16 determines whether the color in the vicinity of the position where the drive assisting indicator 23 is to be superimposed in the captured image 24 is similar to blue green. When the color in the vicinity of the position is not similar to blue green, the process proceeds to step S105. When the color in the vicinity of the position is similar to blue green, the process proceeds to step S106.

At step S105, the image processing apparatus 16 determines blue green as the color of the drive assisting indicator 23. After the determination of the color, the process proceeds to step S107.

At step S106, the image processing apparatus 16 determines yellow as the color of the drive assisting indicator 23. After the determination of the color, the process proceeds to step S107.

At step S107, the image processing apparatus 16 superimposes the drive assisting indicator 23 in color determined at any one of steps S103, S105, and S106 on the captured image 24. After the superimposition of the drive assisting indicator 23 on the captured image, the process proceeds to step S108.

At step S108, the image processing apparatus 16 transmits the captured image 24 including the drive assisting indicator 23 superimposed thereon to the display 15. After the transmission of the captured image 24, the process returns to step S100.

According to the image processing apparatus 16 of the first embodiment configured as described above, the color of the drive assisting indicator 23 is changed, when the braking information is obtained, from the first color to the second color. As mentioned above, the drive assisting indicator 23 is usually displayed in the first color (red), which is easily visible. However, when the brake lamps are lit up and the red light is illuminated to the subject behind the vehicle, the captured image 24 entirely has a tinge of red, making it difficult to view the drive assisting indicator 23 in red. According to the present embodiment, therefore, in consideration of that, when the brake lamps are on, the color of the captured image 24 becomes similar to the first color (red) and, in such a case, the color of the drive assisting indicator 23 is changed to the second color (blue green). Therefore, even when the color of the captured image 24 is similar to red, the drive assisting indicator 23 may be easily viewed.

According to the image processing apparatus 16 of the first embodiment, also, only when the head lamps are on, the color of the drive assisting indicator 23 is changed. It is considered that, when the head lamps are off, the vehicle is located outdoors at daytime where it is bright enough with the ambient light. In such a case, therefore, when the brake lamps are lit up, the color of the subject in the vicinity of the vehicle does not become similar to red, and thus the driver may view the drive assisting indicator 23 in red. On the other hand, it is considered that the head lamps are lit up at nighttime or when the vehicle is located indoors. In such a case, the red light of the brake lamps accounts for the majority of lights emitted to the subject in the vicinity of the vehicle. Accordingly, since the color of the drive assisting indicator 23 is changed only when it is considered to be at nighttime or when the vehicle is located indoors, an unnecessary change of the color may be prevented.

According to the image processing apparatus 16 of the first embodiment, also, when due to the light of the brake lamps in the first color the color in the vicinity of the drive assisting indicator 23 in the captured image 24 becomes similar to the second color (blue green), the color of the drive assisting indicator 23 is changed to the third color (yellow). When color of reflection light of the light emitted in the first color reflected on the subject in the vicinity of the drive assisting indicator 23 is similar to blue green, it may be difficult to view the drive assisting indicator 23 in blue green. In such a case, therefore, the color of the drive assisting indicator 23 is changed to the third color, allowing the driver to easily view the drive assisting indicator 23.

According to the image processing apparatus 16 of the first embodiment, also, the color of the drive assisting indicator 23 is changed based on the lighting information. Therefore, the color is changed without complex processing, allowing a reduction in time required for the change.

According to the image processing apparatus 16 of the first embodiment, further, when the color of the subject in the captured image 24 is similar to the first color (red), the color of the drive assisting indicator 23 is changed to the second color (blue green), which is complementary color of the first color (red). Therefore, the visibility of the drive assisting indicator 23 in the captured image 24 having a tinge of the first color may be improved.

Next, a second embodiment of the present invention will be described. According to the second embodiment, a trigger for changing the color of the drive assisting indicator is different from that of the first embodiment. The second embodiment will be described below, focusing on its differences from the first embodiment. Note that components having the same functions and configurations as those of the first embodiment are denoted by the same reference numerals.

Figure 4:
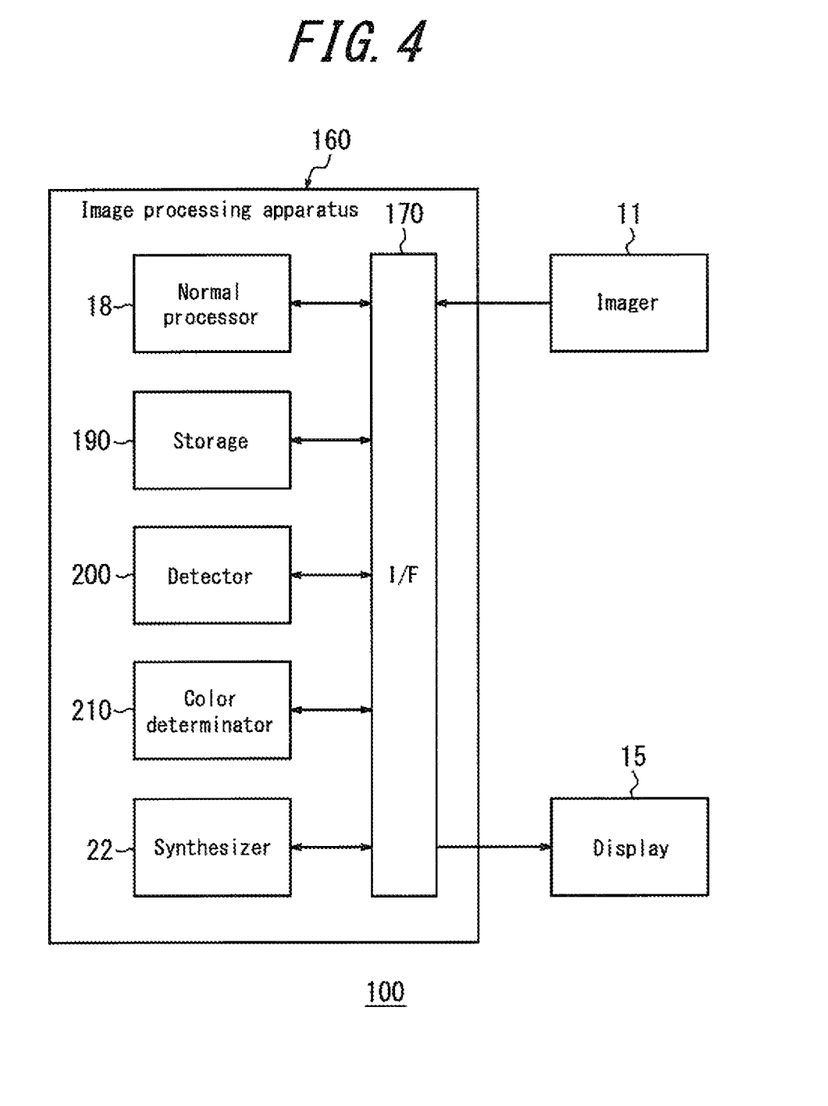
FIG. 4 is a block diagram illustrating a schematic configuration of a drive assisting apparatus including an image processing apparatus according to a second embodiment of the present invention.

As illustrated in FIG. 4, a drive assisting apparatus 100 according to the second embodiment includes the imager 11, the display 15, and an image processing apparatus 160. Unlike the first embodiment, the drive assisting apparatus 100 does not include the brake sensor, the lamp switch, and the ECU. Note that the configurations and functions of the imager 11 and the display 15 are respectively the same as those of the first embodiment.

Similarly to the first embodiment, the image processing apparatus 160 carries out the predetermined image processing to the image signal generated by the imager 11 and transmits thus processed image signal to the display 15. Also, similarly to the first embodiment, the image processing apparatus 160 includes the drive assisting function and may carry out the image processing to display the drive assisting indicator on the video displayed in real time, so as to assist driving.

The image processing apparatus 160 includes an I/F 170, the normal processor 18, a storage 190, a detector 200, a color determinator 210, and the synthesizer 22. The configurations and the functions of the normal processor 18 and the synthesizer 22 are respectively the same as those of the first embodiment.

The I/F 170 is connected to the imager 11 and the display 15 and thus capable of exchanging the information and the signal therewith. Unlike the first embodiment, the I/F 170 is not connected to the ECU. Similarly to the first embodiment, on the other hand, the I/F 170 is connected to the normal processor 18, the storage 190, the detector 200, the color determinator 210, and the synthesizer 22 and exchanges the information and the signal therewith.

The storage 190, similarly to the storage 19 of the first embodiment, stores the outline and the position of the drive assisting indicator 23. Unlike the first embodiment, the storage 190 preliminarily stores a plurality of combinations of colors of the drive assisting indicator 23 associated with the color of the captured image 24. The combinations are predetermined in such a manner that the color of the drive assisting indicator 23 serves as the complementary color of the color of the captured image 24.

The detector 200, based on the image signal obtained from the imager 11, detects color of each pixel making up the captured image 24. The detector 200, based on hue of each pixel, determines whether the captured image 24 is entirely colored particular color. The detector 200, when the captured image 24 has a tinge of the particular color overall, detects the color of the captured image 24.

Whether the captured image 24 has a tinge of the particular color overall is determined in such a manner as described below. That is, the detector 200, after detecting the color of each pixel, classifies the detected hue into color with the most similar hue among predetermined plurality of colors. The predetermined plurality of colors are colors obtained by equally dividing the color wheel. The detector 200 creates a histogram having color with a highest degree among the classified colors at the center thereof. The detector 200 detects the number of samples classified into colors in a predetermined range having the color with the highest degree at the center thereof, and calculates a ratio thereof to a total number of samples. When thus calculated ratio exceeds a threshold, the determinator 200 determines that the captured image 24 has a tinge of the particular color overall and detects the color with the highest degree as the color of the captured image 24.

The color determinator 210, based on whether the detector 200 detects the particular color of the captured image and also on the particular color of the captured image 24 detected by the detector 200, determines the color of the drive assisting indicator 23. The color determinator 210, in order to determine the color of the drive assisting indicator 23, determines whether the detector 200 detects the particular color of the captured image 24.

When the detector 200 does not detect the particular color of the captured image 24, the color determinator 210 determines the first color, e.g., red as the color of the drive assisting indicator 23. When the detector 200 detects the particular color of the captured image 24, the color determinator 210 determines the color of the drive assisting indicator 23 based on the particular color of the captured image 24. The color determinator 210 retrieves color of the drive assisting indicator 23 coupled to the particular color of the captured image 24 from the storage 190. The color determinator 210 determines thus retrieved color as the color of the drive assisting indicator 23.

Figure 5:
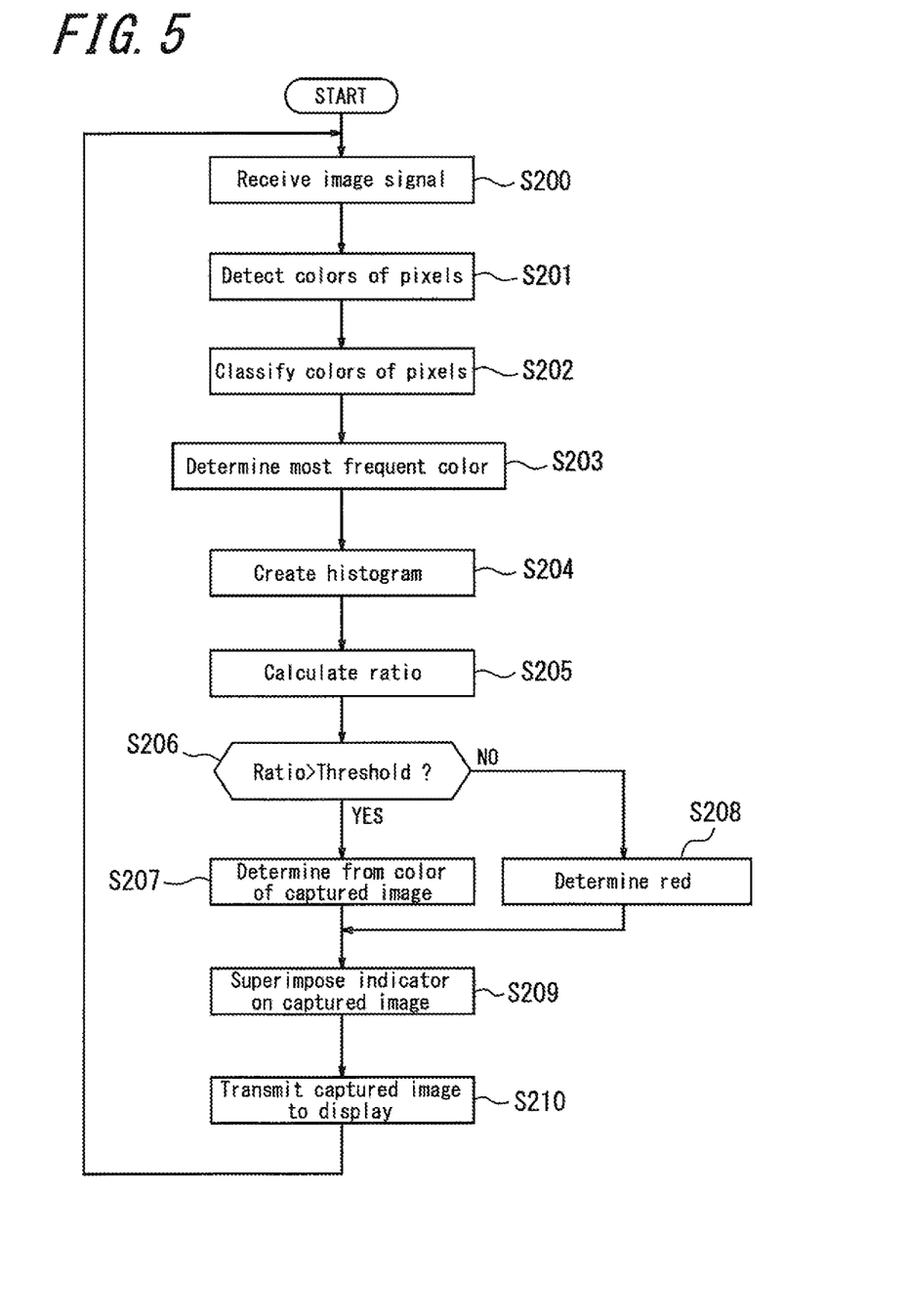
FIG. 5 is a flowchart of a drive assisting processing executed by the image processing apparatus according to the second embodiment.

Next, the drive assisting processing executed by the image processing apparatus 160 will be described with reference to a flowchart in FIG. 5. The drive assisting processing starts when an input unit of the image processing apparatus 160 detects an input to start execution of the drive assisting function. Also, the drive assisting processing ends upon detection of an input to end the execution of the drive assisting function.

At step S200, the image processing apparatus 160 receives the image signal from the imager 11. After the reception of the image signal, the process proceeds to step S201.

At step S201, the image processing apparatus 160 detects color of each pixel making up the captured image 24 corresponding to the image signal received at step S200. After the detection of the colors of the pixels, the process proceeds to step S202.

At step S202, the image processing apparatus 160 classifies the colors of the pixels detected at step S201 into colors in a predetermined color wheel. After the classification of the colors of all pixels of the captured image, the process proceeds to step S203.

At step S203, the image processing apparatus 160 determines the most frequent color among the classified colors, i.e., in sample pixels. After the determination of the most frequent color, the process proceeds to step S204.

At step S204, the image processing apparatus 160 creates the histogram of each of the colors having the color determined at step S203 at the center thereof. After the creation of the histogram, the process proceeds to step S205.

At step S205, the image processing apparatus 160 calculates the number of samples classified into the colors in the predetermined range from the most frequent color and calculates a ratio of the calculated number of samples to the total number of samples, i.e., pixels. After the calculation of the ratio, the process proceeds to step S206.

At step S206, the image processing apparatus 160 compares the ratio calculated at step S206 to the threshold. When the ratio exceeds the threshold, the process proceeds to step S207. When the ratio is no more than the threshold, the process proceeds to step S208.

At step S207, the image processing apparatus 160 determines the color determined at step S203 as the particular color of the captured image 24 and also determines the color preliminarily coupled to the particular color as the color of the drive assisting indicator 23. After the determination of the colors, the process proceeds to step S209.

At step S208, the image processing apparatus 160 determines red as the color of the drive assisting indicator 23. After the determination of the color, the process proceeds to step S209.

At step S209, the image processing apparatus 160 superimposes the drive assisting indicator 23 in the color determined at either one of steps S207 and S208 on the captured image 24. After the superimposition of the drive assisting indicator 23 on the captured image 24, the process proceeds to step S210.

At step S210, the image processing apparatus 160 transmits the captured image 24 including the drive assisting indicator 23 superimposed thereon to the display 15. After the transmission of the captured image, the process returns to step S200.

The image processing apparatus 160 of the second embodiment having the configuration as described above also changes the color of the drive assisting indicator 23, when the captured image 24 has a tinge of the particular color overall, from the first color to the second color. Accordingly, when the captured image 24 is in color similar to the first color (red), the drive assisting indicator 23 may be easily viewed.

According to the image processing apparatus 160 of the second embodiment, also, when the captured image 24 has a tinge of the particular color overall, the drive assisting indicator 23 is colored the complementary color of the particular color. Accordingly, the visibility of the drive assisting indicator 23 may be improved.

Although the present invention has been described based on the figures and the embodiments, it is to be understood that various changes and modifications may be implemented based on the present disclosure by those who are ordinarily skilled in the art. Accordingly, such changes and modifications are included in the scope of the present invention.

For example, although in the first and second embodiments the color of the drive assisting indicator 23 is changed to the complementary color of the color of the captured image 24, the color of the drive assisting indicator 23 may be changed such that at least one of hue, brightness, and intensity of the drive assisting indicator 23 differs from those of the color of the captured image 24.

Also, although in the first embodiment, assuming that the head lamps are on based on the lighting information, that is, assuming that it is at nighttime or the vehicle is located indoors, the color of the drive assisting indicator 23 is changed, the present invention is not limited to this manner. For example, assuming that it is at nighttime or the vehicle is located indoors based on an average value of the brightness of the entire captured image, the color of the drive assisting indicator 23 may be changed.

REFERENCE SIGNS LIST

10, 100 drive assisting apparatus
11 imager
12 brake sensor
13 lamp switch
14 ECU (Engine Control Unit)
15 display
16 160 image processing apparatus
17, 170 I/F
18 normal processor
19, 190 storage
20, 200 detector
21, 210 color determinator
22 synthesizer
23 drive assisting indicator
24 captured image
25 vehicle width extension line
26 reference distance line

The invention claimed is:

1. An image processing apparatus comprising: a receiver that receives a captured image generated by imaging a subject in a vicinity of a vehicle; a synthesizer that superimposes an indicator on the captured image; and a color determinator that changes color of the indicator from a first color when color of the captured image is similar to the first color, wherein the receiver is capable of receiving a lighting signal for lighting up a brake lamp of the vehicle that emits illumination light in the first color to the vicinity of the vehicle, said lighting signal being braking information indicating a braking state, and the color determinator, when receiving the lighting signal, changes the color of the indicator to a second color.

2. The image processing apparatus according to claim 1, comprising a detector for detecting color of the subject based on the captured image generated while the brake lamp is lit up, wherein the color determinator, when the color of the subject that is detected is similar to the second color, changes the color of the indicator to a third color.

3. The image processing apparatus according to claim 1, wherein
the color determinator, at least one of when the superimposition of the indicator is carried out at nighttime and when the vehicle is located indoors, changes the color of the indicator from the first color.

4. The image processing apparatus according to claim 1, comprising a detector that detects the color of the subject based on the captured image.

5. The image processing apparatus according to claim 1, wherein
the color determinator changes the color of the indicator such that at least one of hue, brightness, and intensity of the color of the indicator differs from those of the color of the captured image.

6. The image processing apparatus according to claim 1, wherein
the color determinator changes the color of the indicator to complementary color of the color of the subject.

7. An imaging apparatus comprising: an imager for generating a captured image by imaging a subject in a vicinity of a vehicle; a synthesizer that superimposes an indicator on the captured image; and a color determinator, when color of the captured image is similar to a first color, that changes color of the indicator from the first color; and a receiver is capable of receiving a lighting signal for lighting up a brake lamp of the vehicle that emits illumination light in the first color to the vicinity of the vehicle, said lighting signal being braking information indicating a braking state, wherein the color determinator, when receiving the lighting signal, changes the color of the indicator to a second color.

8. A drive assisting method comprising: generating a captured image by imaging a subject in a vicinity of a vehicle; comparing color of the subject to a first color; changing color of an indicator from the first color when the color of the subject is similar to the first color; superimposing, on the captured image, the indicator in the first color or in color after the change at the changing step; receiving a lighting signal for lighting up a brake lamp of the vehicle that emits illumination light in the first color to the vicinity of the vehicle, said lighting signal being braking information indicating a braking state, and the when receiving the lighting signal, changing the color of the indicator to a second color.

* * * * *